US009883051B2

(12) United States Patent
Dandra et al.

(10) Patent No.: US 9,883,051 B2
(45) Date of Patent: Jan. 30, 2018

(54) METHOD AND SYSTEM FOR USAGE OF MANUAL PLMN SELECTION MODE

(71) Applicants: Prasad Basavaraj Dandra, Bangalore (IN); Vijay Ganesh Surisetty, Bangalore (IN); Srinivas Chinthalapudi, Bangalore (IN)

(72) Inventors: Prasad Basavaraj Dandra, Bangalore (IN); Vijay Ganesh Surisetty, Bangalore (IN); Srinivas Chinthalapudi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/062,792

(22) Filed: Mar. 7, 2016

(65) Prior Publication Data
US 2016/0269568 A1    Sep. 15, 2016

(30) Foreign Application Priority Data

Mar. 11, 2015   (IN) .......................... 1202/CHE/2015
Nov. 23, 2015   (IN) .......................... 1202/CHE/2015

(51) Int. Cl.
| | | |
|---|---|---|
| *H04M 15/00* | (2006.01) | |
| *H04W 8/06* | (2009.01) | |
| *H04W 4/00* | (2009.01) | |
| *H04W 48/18* | (2009.01) | |
| *H04W 8/18* | (2009.01) | |

(52) U.S. Cl.
CPC ....... *H04M 15/7556* (2013.01); *H04W 48/18* (2013.01); *H04M 2215/7231* (2013.01); *H04W 8/18* (2013.01)

(58) Field of Classification Search
CPC ..... H04M 15/7556; H04M 2215/7231; H04W 48/18; H04W 84/042; H04W 8/18
USPC ....................................... 455/433–434, 432.1
See application file for complete search history.

(56) References Cited

U.S. PATENT DOCUMENTS

| | | | |
|---|---|---|---|
| 7,983,713 B2 | 7/2011 | Sasse et al. | |
| 8,688,093 B2 | 4/2014 | Bloebaum et al. | |
| 2005/0227688 A1* | 10/2005 | Li .......................... | H04W 48/18 455/432.1 |
| 2005/0250529 A1* | 11/2005 | Funnell ................. | H04W 36/24 455/525 |
| 2006/0052100 A1* | 3/2006 | Almgren ................. | H04W 8/12 455/432.1 |
| 2007/0254646 A1* | 11/2007 | Sokondar .............. | H04W 8/183 455/432.1 |
| 2008/0020761 A1* | 1/2008 | Park ...................... | H04W 48/16 455/434 |

(Continued)

*Primary Examiner* — Nathan Taylor
(74) *Attorney, Agent, or Firm* — The Farrell Law Firm, P.C.

(57) ABSTRACT

A method of selecting a public land mobile network (PLMN) for enabling a user equipment (UE) to communicate and a user equipment are provided. The method includes checking, by the UE, whether an elementary file (EF) is present in a universal integrated circuit card (UICC) inserted in the UE, if the UE initiates a procedure for selecting a PLMN, wherein the EF includes a PLMN selection mode; and selecting, by the UE, a PLMN based on the PLMN selection mode. The UE is configured to check if an EF is present in a UICC inserted in the UE, if the UE initiates a procedure for selecting a PLMN, wherein the EF includes a PLMN selection mode; and select a PLMN based on the PLMN selection mode.

18 Claims, 3 Drawing Sheets

(56) References Cited

U.S. PATENT DOCUMENTS

| | | | |
|---|---|---|---|
| 2008/0146280 A1* | 6/2008 | Sasse | H04W 8/183 455/558 |
| 2009/0075639 A1* | 3/2009 | Bloebaum | H04M 1/72563 455/418 |
| 2009/0156253 A1* | 6/2009 | Shi | H04L 29/1216 455/558 |
| 2009/0215447 A1* | 8/2009 | Catalano | H04W 48/18 455/432.1 |
| 2010/0197350 A1* | 8/2010 | Jeung | H04W 8/183 455/558 |
| 2010/0214958 A1* | 8/2010 | Wijayanathan | H04W 8/18 370/255 |
| 2011/0003590 A1* | 1/2011 | Yoon | H04W 36/385 455/432.1 |
| 2011/0075608 A1* | 3/2011 | Chai | H04W 48/18 370/328 |
| 2012/0064889 A1* | 3/2012 | Tiwari | H04W 8/186 455/434 |
| 2013/0045737 A1* | 2/2013 | Manalo | H04W 60/04 455/433 |
| 2013/0203465 A1* | 8/2013 | Ali | H04W 4/003 455/558 |
| 2014/0342732 A1* | 11/2014 | Manalo | H04W 8/06 455/433 |

* cited by examiner

METHOD AND SYSTEM FOR USAGE OF MANUAL PLMN SELECTION MODE

PRIORITY

This application claims priority under 35 U.S.C. § 119(a) to an Indian Provisional Patent Application filed on Mar. 11, 2015 in the Indian Intellectual Property Office and assigned Serial No. 1202/CHE/2015(PS), and an Indian Complete Patent Application filed on Nov. 23, 2015 in the Indian Intellectual Property Office and assigned Serial No. 1202/CHE/2015(CS), the entire contents of each of which are incorporated herein by reference.

BACKGROUND

1. Field of the Disclosure

The present disclosure relates generally to cellular communication networks and, more particularly, to manual public land mobile network (PLMN) selection in cellular communication networks.

2. Description of the Related Art

The 3GPP specification (in particular, 3GPP spec 23.122, section 4.4.3.1.2) enables a user to select a PLMN for user equipment (UE) operation, in a manual mode. In the manual mode, the UE must select the user selected PLMN and the UE must register with the user selected PLMN. If there is no selected PLMN or registered PLMN, the UE will either display a list to the user and remain in limited service or select the home PLMN (HPLMN) if available (provided the UE is powered on).

However, 3GPP does not handle all possible critical scenarios. For example, if a particular device A with a first universal integrated circuit card (UICC), UICC A is being used, the user of device A performs a manual search and selects PLMN A. The device A gets registered on PLMN A. The user of device A inserts a second UICC, UICC B in device A. The device will power on in manual mode and may go to a limited state (if UICC B has no registered PLMN (RPLMN)) or display a list of possible PLMNs to the user, which the user may ignore. The device A may remain in a "no service" state, with the UICC B.

In another case, the user may insert UICC A after manual selection and registration into device B. In this case, the device B will operate in its current mode, which may be an automatic mode and automatically select a PLMN. The user may be required to pay an additional fee, if his previous desired PLMN is not selected.

For example, a user may select PLMN X manually using an international mobile subscriber identity (IMSI) XX in UICC A in a roaming area to minimize the call and data charges and the device is registered successfully with the PLMN X. Then, the user may insert the UICC A (IMSI A) in a different device and powers the device on. Since that device was operating in automatic mode and an RPLMN was not available temporarily, this device selects a different PLMN of which the user was not aware. Unaware of the current registered PLMN, the user may be charged significantly as the UE is using a circuit switched (CS) call and packet switched (PS) data on a different PLMN in roaming.

As another example, a user selects PLMN X manually with the UICC A in a roaming area to minimize the call and data charges on a device A and the registration of the device with the PLMN X is successful. Then, the user inserts another UICC B in device A. Since device A was operating in manual mode and the RPLMN in UICC B is invalid, the UE will go to limited service and remain in limited service until the user changes to automatic mode and selects a new PLMN. If the user does not notice or cancels the PLMN list, the UE will remain in limited service.

SUMMARY

An aspect of the present disclosure provides an elementary file (EF) in a UICC present in a UE, wherein the EF comprises a PLMN selection mode and the UE fetches the PLMN selection mode from the EF, when required, and selects the PLMN accordingly.

Another aspect of the present disclosure provides a method and system to enable a UE to change the PLMN selection mode to automatic, when the UICC is changed (where the UICC does not support the EF comprising the PLMN selection mode).

In accordance with an aspect of the present disclosure, a method of selecting a PLMN for enabling a UE to communicate is provided. The method includes checking, by the UE, whether an EF is present in a UICC inserted in the UE, if the UE initiates a procedure for selecting a PLMN, wherein the EF includes a PLMN selection mode; and selecting, by the UE, a PLMN based on the PLMN selection mode.

In accordance with another aspect of the present disclosure, a UE is provided. The UE is configured to check if an EF is present in a UICC inserted in the UE, if the UE initiates a procedure for selecting a PLMN, wherein the EF includes a PLMN selection mode; and select a PLMN based on the PLMN selection mode. In accordance with another aspect of the present disclosure, a UE is provided. The UE includes a UE controller; at least one universal integrated circuit card (UICC) connected to the UE controller, wherein the at least one UICC includes an elementary file (EF) containing a public land mobile network (PLMN) selection mode; a user interface connected to the UE controller; a non-volatile memory connected to the UE controller; and a communication module connected to the UE controller.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
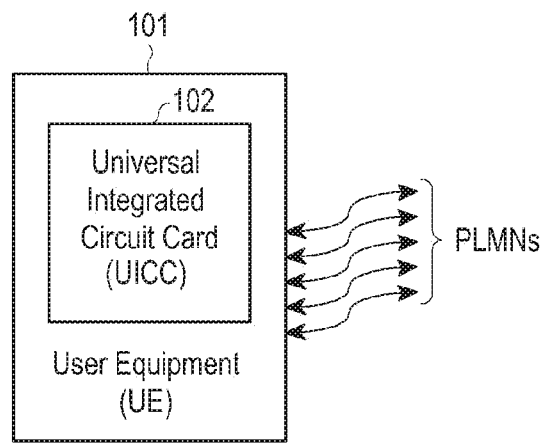
FIG. 1 is a block diagram of a UE configured to connect to at least one PLMN using at least one UICC inserted into the UE, according to an embodiment of the present disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an EF in a UICC present in a UE, wherein the EF includes a PLMN selection mode and the UE fetches the PLMN selection mode from the EF, if required, and selects the PLMN accordingly. In the accompanying drawings, similar reference characters denote corresponding features consistently throughout the accompanying drawings.

Embodiments disclosed herein use the terms "UICC" and "Subscriber Identity Module (SIM) Card" interchangeably and it may be obvious to a person of ordinary skill in the art that the terms "UICC" and "SIM card" denote the UICC and do not restrict the embodiments as disclosed herein to a specific wireless communication network technology. Further, the term "UICC" may be used interchangeably with "SIM," "SIM card," "smart card," "network identity card," "micro SIM card," "mini SIM card" or any other equivalent means which enables a UE to communicate over a wireless communication network.

The UE as referred to herein may be at least one of a mobile device, a smartphone, a personal digital assistant (PDA), a tablet, a wearable smart device, a phone, a cellular device, a cellphone, a mobile phone, a mobile terminal, an electronic tablet, or any other device configured to communicate using a UICC. The UE may include one or more slots for holding one or more UICCs, wherein the UE may use one or more UICCs for communication, simultaneously or one at a time. The UE may support a feature of SIM/UICC card exchange such as a hot swap or any other suitable means. The UE may also support a change of the UICC/SIM card manually or through the UE by a user of the UE.

Embodiments herein disclose an EF in the UICC card. Embodiments herein further refer to the EF as EF_PlmnMode. The EF may include a PLMN selection mode. When the UICC card is moved to a new UE or in any other situation where a UE is required to select a PLMN, the UE will fetch the PLMN selection mode from the EF_PlmnMode and select a PLMN according to the PLMN selection mode.

FIG. 1 is a block diagram of a UE 101 configured to connect to at least one PLMN using at least one UICC 102 inserted into the UE, according to an embodiment of the present disclosure.

Referring to FIG. 1, the UE 101 is connected to at least one PLMN. The UE 101 may include at least one slot within which the UICC 102 may be inserted, thereby allowing electronic contact between the UE 101 and the UICC 102. A network operator may enable the UE 101 to communicate using wireless communication means such as long term evolution (LTE), global system for mobile communication (GSM), universal mobile telecommunications system (UMTS), enhanced data rates for GSM evolution (EDGE), code division multiple access (CDMA), CDMA2000 and so on. The term "PLMN" may be used interchangeably with "network," "operator," "wireless carrier," "telecommunication network," "LTE network," "wireless network," "communication network," and so on. The PLMN enables the UE 101 to communicate using the UICC 102, associated with the UE 101.

The UE 101, upon detecting that a PLMN needs to be selected, initiates a procedure for selecting a PLMN. The UE 101 checks for the presence of an EF in the UICC 102. The EF includes a PLMN mode and information related to the last PLMN to which the UE 101 was connected. Based on the information present in the EF, the UE 101 may perform a step regarding the PLMN selection. The step may be at least one of automatically selecting a PLMN, enabling the user of the UE 101 to select a PLMN, and so on. The UE 101 and the UICC 102 may edit the EF, if required, based on the action taken. The UE 101 may also change the PLMN mode and make the edits in the EF accordingly.

Figure 2:
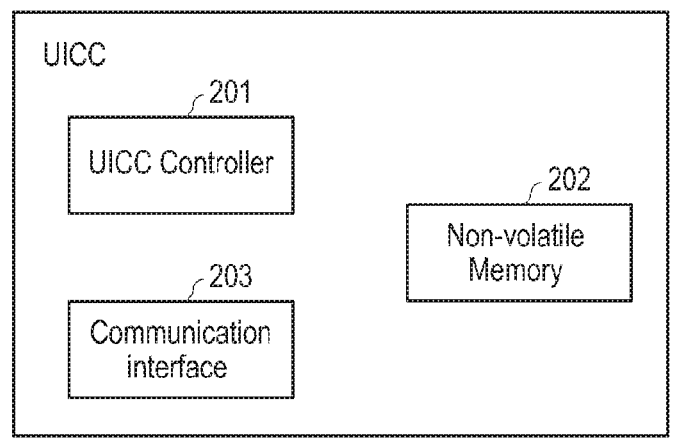
FIG. 2 is a block diagram of a UICC, according to an embodiment of the present disclosure.

FIG. 2 is a block diagram of the UICC 102, according to an embodiment of the present disclosure.

Referring to FIG. 2, the UICC 102 may include a UICC controller 201, a non-volatile memory (NVM) 202 and a communication interface 203. The UICC controller 201 may be a hardware processor that may control the flow of data. The non-volatile memory 202 may be a memory in the UICC 102. The non-volatile memory 202 includes data such as an integrated circuit card identifier (ICCID), counters, updates from the network operator to which the UICC 102 belongs, user data, EFs and so on. The non-volatile memory 202 may include an EF (also referred to as EF_PlmnMode), wherein the EF_PlmnMode includes the PLMN manually selected by the user of the UE. The communication interface 203 in the UICC 102 may be used for communication with the UE 101 and the PLMN. The communication interface 203 may include a plurality of interfaces, such as a physical electrical contact based interface, an air interface and so on.

The UICC controller 201 may receive an indication from the UE 101 about a PLMN that has been selected by a user of the UE 101 (when the UE 101 is operating in a manual PLMN selection mode), through the communication interface 203. The UICC controller 201 may check if the EF_PlmnMode file is present in the non-volatile memory 202. The PLMN mode from the EF_PlmnMode may be manual, automatic, and so on. The UICC controller 201 may toggle the mode, depending on the mode that the UE 101 is currently operating in. The EF_PlmnMode may further include information such as the PLMN last selected by the user, any other related option (as set by the user or any other authorized person and/or entity), the current IMSI, and so on. The UICC controller 201 may further store the EF_PlmnMode file in the non-volatile memory 202.

Upon receiving an indication from the UE 101 about a change in the PLMN selection mode or any other information, the UICC controller 201 may modify the EF_PlmnMode file, accordingly.

On receiving a request from the UE 101 about the PLMN mode through the communication interface 203, the UICC controller 201 may fetch the PLMN mode from the EF_PlmnMode file. The UICC controller 201 may also fetch any other information, as required. The UICC controller 201 may provide the fetched information to the UE 101, using the communication interface 203.

Figure 3:
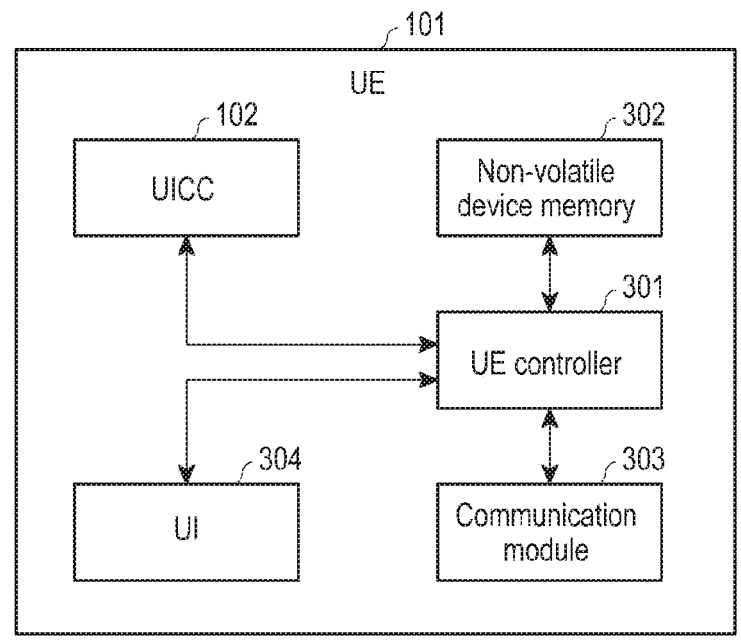
FIG. 3 is a block diagram of a UE, according to an embodiment of the present disclosure.

FIG. 3 is a block diagram of the UE 101, according to an embodiment of the present disclosure.

Referring to FIG. 3, the UE 101 includes a UE controller 301, a non-volatile device memory 302, at least one communication module 303 and a user interface (UI) 304. The UE controller 301 may be a hardware processor that may control the functions of the UE 101 and enable operations to be performed by the UE 101. The non-volatile device memory 302 may be a memory in the UE 101. The non-volatile memory 302 may include data such as user data, network data, a synchronous identifier (Sync ID) (as last read by the UE 101) and so on. The communication module 303 may be used for communication with the UICC 102 and the PLMNs. The communication module 303 may include a plurality of interfaces, such as a physical electrical contact based interface, at least one air interface and so on. The UI 304 may be at least one of a touchscreen based UI, a physical keyboard/pad, a physical button, or any other suitable means, which enables a user to view information and interact with the UE 101.

For example, the UE 101 may be required to initiate a procedure for selecting a PLMN (e.g., when the UE 101 detects a UICC 102 newly inserted into the UE 101, when the UE 101 moves to a region where a previously selected PLMN is not available, the current PLMN has rejected the connection from the UE 101, the UE 101 has been started/initialized, an invalid RPLMN, and so on).

The UE controller 301 may first check the mode of a PLMN selection, by fetching an EF_PlmnMode file and other information from the UICC 102.

For example, the UE 101 may operate in manual mode. Upon the UE controller 301 detecting that the IMSI has been changed and the UICC 102 associated with the new IMSI does not include the EF_PlmnMode file, the UE controller 301 may change the PLMN selection mode to automatic mode. The UE 101 may optionally avoid changes in PLMN selection mode, if the change in the IMSI is due to UICC 102 operation based on factors such as location, network rejects and so on.

For example, the UICC 102 may have changed and the UE 101 may be currently operating in manual mode. The UE controller 301 may provide the user of the UE 101 with an indication that the UE 101 is currently operating in manual PLMN selection mode, using the UI 304. The indication may be in the form of at least one of a pop-up, a status bar indication, an audio indication (such as a pre-defined tone), a combination of a visual and an audio indication, a widget, and so on. Optionally, a user may provide a confirmation using the UI 304. The user may also change the mode to automatic. Optionally, a user may select a PLMN, to which the UE 101 must connect. The UE controller 301 may perform corresponding actions such as continuing to use the previously selected PLMN (e.g. if the user opts to continue in manual mode or there is no input from the user), automatically selecting a PLMN based on at least one criterion (if the user opts to operate the UE 101 in automatic mode), modifying the EF_PlmnMode file in the UICC 102, and so on.

For example, the UE controller 301 may detect that the UICC 102 contains an invalid RPLMN and the EF_PlmnMode file indicates that the UE 101 is in manual mode. The UE controller 301 may provide the user of the UE 101 with an indication that the UE 101 is currently operating in manual PLMN selection mode, using the UI 304. The indication may be at least one of a pop-up, an indication in a status bar, an audio indication (such as a pre-defined tone), a combination of a visual and an audio indication, a widget, and so on. Optionally, a user may provide a confirmation using the UI 304. A user may also change the mode to automatic. Optionally, a user may select a PLMN, to which the UE 101 must connect. The UE controller 301 may perform corresponding actions such as continuing to use the previously selected PLMN (if the user opts to continue in manual mode or there is no input from the user), automatically select a PLMN based on at least one criterion (if the user opts to operate the UE 101 in automatic mode), modifying the EF_PlmnMode file in the UICC 102, and so on. In an embodiment of the present disclosure, if a user has not provided an input within a pre-defined time period, the UE controller 301 may switch to automatic mode automatically, based on a previous configuration from the user or based on previous selection(s) by the user.

If the UE controller 301 detects a change in the UICC 102 or IMSI (such as a change in the IMSI due to a current UICC 102 decision through refresh), the UE controller 301 may ignore the previous PLMN selection mode. The UE controller 301 may switch to automatic mode and select a suitable PLMN. The UE controller 301 may consider a previous configuration from a user or previous selection(s) by the user, when selecting the PLMN.

If the UE controller 301 detects a change in the UICC 102 or IMSI (for example, a change in the IMSI due to a current SIM decision through refresh), the UE controller 301 may select a PLMN based on the mode indicated in the EF_PlmnMode file. If the UICC 102 contains an invalid RPLMN and the EF_PlmnMode has manual mode, the UE controller 301 may provide a user of the UE 101 with an indication that the UE 101 requests the user to select a PLMN from a list of PLMNs displayed to the user, using the UI 304. The indication may be at least one of a pop-up, an indication in a status bar, an audio indication (such as a pre-defined tone), a combination of a visual and an audio indication, a widget, and so on. Optionally, a user may provide a confirmation using the UI 304. A user may also change the mode to automatic. The UE controller 301 may perform corresponding actions such as continuing to use a previously selected PLMN (if the user opts to continue in manual mode or there is no input from a user), automatically select a PLMN based on at least one criterion (if the user opts to operate the UE 101 in automatic mode), modify the EF_PlmnMode file in the UICC 102, and so on.

Figure 4:
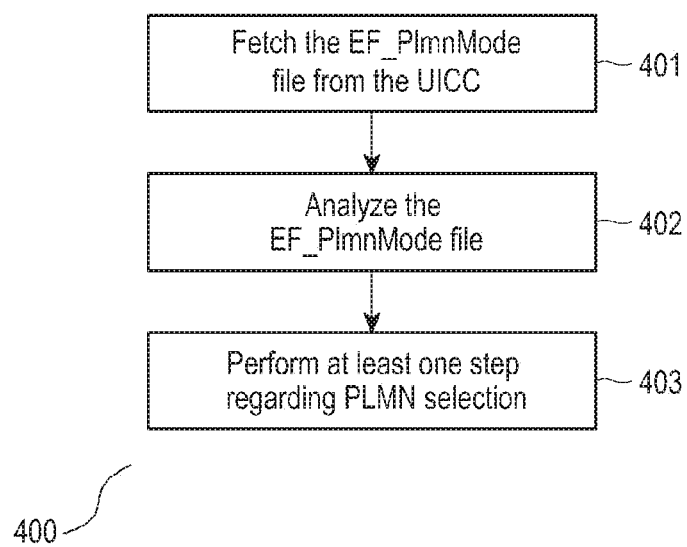
FIG. 4 is a flowchart of a method of a UE selecting a PLMN, according to an embodiment of the present disclosure.

FIG. 4 is a flowchart of a method of a UE selecting a PLMN, according to an embodiment of the present disclosure. The UE 101, upon initiating a procedure for selecting a PLMN, fetches, in step 401, the EF_PlmnMode from the UICC 102. The UE 101 analyzes, in step 402, the EF_PlmnMode. Based on the information present in the EF, the UE 101 performs, in step 403, at least one step regarding the PLMN selection. The step may be at least one of automatically selecting a PLMN, enabling a user of the UE 101 to select a PLMN, and so on. The UE 101 and the UICC 102 may edit the EF, if required, based on the action taken. The UE 101 may also opt to change the PLMN selection mode and edit the EF accordingly. The various actions in the method 400 may be performed in the order presented, in a different order or simultaneously. Further, in an embodiment of the present disclosure, some actions listed in FIG. 4 may be omitted.

Figure 5:
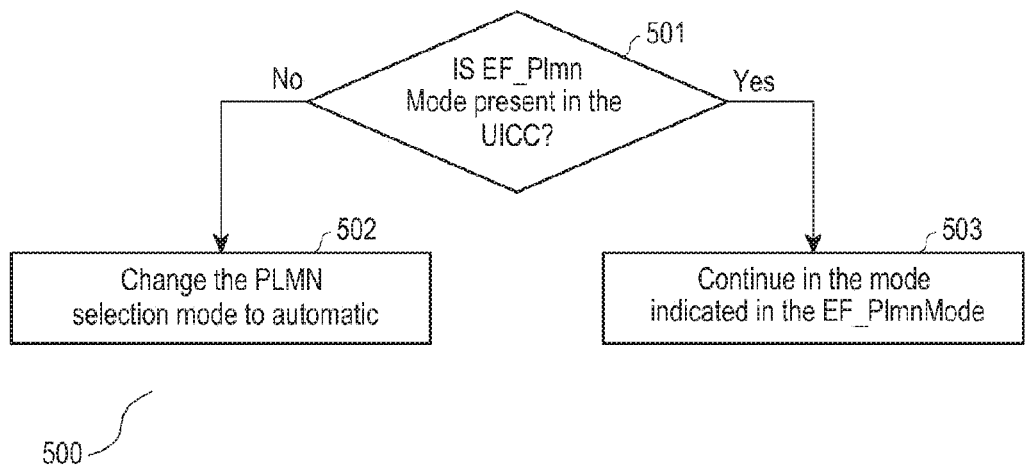
FIG. 5 is a flowchart of a method of choosing a mode if an IMSI has been changed, according to an embodiment of the present disclosure.

FIG. 5 is a flowchart of a method of choosing a mode when an IMSI has been changed. Upon detecting that the IMSI has been changed, the UE 101 checks, in step 501, if the EF_PlmnMode file is present in the UICC associated with the new IMSI, wherein the UICC is present in the UE. If the EF_PlmnMode file is not present in the UICC 102, the UE 101 changes, in step 502, the PLMN selection mode to automatic mode. The UE 101 may optionally avoid a change in the PLMN selection mode, if the change in the IMSI is due to UICC card operation based on factors such as location, network rejections and so on. If the EF_PlmnMode file is present in the UICC 102, the UE 101 continues, in step 503, in a mode as indicated in the EF_PlmnMode file. The various actions in the method 500 may be performed in the order presented, in a different order, or simultaneously. Further, in an embodiment of the present disclosure, some actions listed in FIG. 5 may be omitted.

Figure 6:
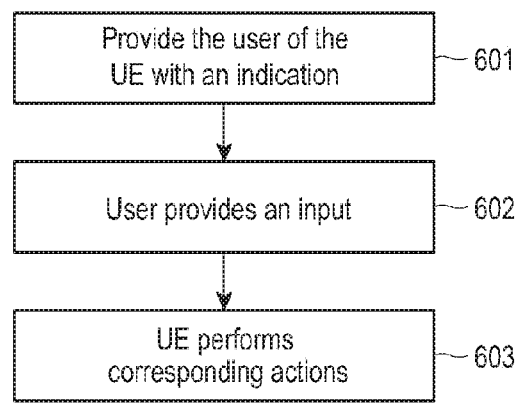
FIG. 6 is a flowchart of a method of selecting a PLMN in manual mode, according to an embodiment of the present disclosure.

FIG. 6 is a flowchart of a method of selecting a PLMN in manual mode. For example, if a PLMN needs to be selected and the UE 101 is currently operating in manual mode, the UE 101 provides, in step 601, a user of the UE 101 with an indication that the UE 101 is currently operating in manual PLMN selection mode and that a PLMN needs to be selected. The indication may be at least one of a pop-up, an indication in a status bar, an audio indication (such as a pre-defined tone), a combination of a visual and an audio indication, a widget, and so on. A user provides, in step 602, an input, in response to the indication. The input may be to change the mode to automatic. The input may be to select a PLMN to which the UE 101 has to connect. In an embodiment of the present disclosure, if a user has not provided an input within a pre-defined time period, the UE controller 301 may switch to automatic mode automatically, based on a previous configuration from the user or based on a previous selection(s) by the user. The UE 101 performs, in step 603, corresponding actions such as continuing to use the previously selected PLMN (if the user opts to continue in manual mode or there is no input from the user), automatically selecting a PLMN based on at least one criterion (if the user opts to operate the UE 101 in automatic mode), modifying the EF_PlmnMode file in the UICC 102, and so on. The various actions in method 600 may be performed in the order presented, in a different order, or simultaneously. Further, in an embodiment of the present disclosure, some actions listed in FIG. 6 may be omitted.

In an embodiment of the present disclosure, a user may be considered irrespective of a change in a device. This provides an advantage in roaming areas where call and data charges vary with different operators.

When a device is in manual mode and the UICC card is changed and the new UICC contains an invalid RPLMN, an embodiment of the present disclosure will avoid limited service and provide normal service to a user.

An embodiment of the present disclosure applies to devices with a plurality of SIM cards. An embodiment of the present disclosure also applies to a hot swap of UICC cards in multi SIM card devices.

An embodiment of the present disclosure may be implemented through at least one software program running on at least one hardware device and performing network management functions to control elements. The elements shown in FIG. 1 may be at least one of a hardware device, or a combination of a hardware device and a software module.

The foregoing description of the embodiments will so fully reveal the general nature of the embodiments herein that others may, by applying current knowledge, readily modify and/or adapt for various applications such embodiments without departing from the present disclosure, and, therefore, such adaptations and modifications are intended to be comprehended within the meaning and range of equivalents of the disclosed embodiments. It is to be understood that the terminology employed herein is for the purpose of description and not of limitation. Therefore, while the embodiments herein have been described, those skilled in the art will recognize that the embodiments herein may be practiced with modification within the scope of the present disclosure as defined by the appended claims and their equivalents.

What is claimed is:

1. A method of selecting a public land mobile network (PLMN) for enabling a user equipment (UE) to communicate, the method comprising:
   checking, by the UE, whether an elementary file (EF) is present in a universal integrated circuit card (UICC) inserted in the UE, if the UE initiates a procedure for selecting a PLMN, wherein the EF includes a PLMN selection mode;
   selecting, by the UE, a PLMN based on the PLMN selection mode; and
   when the EF is not present in the UICC, automatically selecting the PLMN, by the UE, upon detecting a change in at least one of an international mobile subscriber identity (IMSI) and the UICC.

2. The method of claim 1, further comprising enabling, by the UE, a user of the UE to select the PLMN, if the PLMN selection mode is in a manual mode.

3. The method of claim 1, further comprising selecting the PLMN by the UE in an automatic manner based on at least one criterion, if the PLMN selection mode is in an automatic mode.

4. The method of claim 1, further comprising modifying the PLMN selection mode, based on the PLMN selected by the UE.

5. The method of claim 1, wherein the UE is one of a mobile device, a smartphone, a personal digital assistant (PDA), a tablet, a wearable smart device, a phone, a cellular device, a cellphone, a mobile phone, a mobile terminal, an electronic tablet, and any other device configured to communicate using a UICC.

6. The method of claim 1, wherein the UE communicates by one of long term evolution (LTE), global system for mobile communication (GSM), universal mobile telecommunications system (UMTS), enhanced data rates for GSM evolution (EDGE), code division multiple access (CDMA), and CDMA2000.

7. The method of claim 1, wherein a manual mode is indicated by one of a pop-up, an indication in a status bar, an audio indication, a combination of a visual and an audio indication, and a widget.

8. A user equipment (UE) configured to:
   check if an elementary file (EF) is present in a universal integrated circuit card (UICC) inserted in the UE, if the UE initiates a procedure for selecting a public land mobile network (PLMN), wherein the EF includes a PLMN selection mode;
   select a PLMN based on the PLMN selection mode; and
   when the EF is not present in the UICC, to select the PLMN automatically upon detecting a change in at least one of an international mobile subscriber identity (IMSI) and the UICC.

9. The UE of claim 8, wherein the UE is further configured to enable a user of the UE to select the PLMN, if the PLMN selection mode is in a manual mode.

10. The UE of claim 8, wherein the UE is further configured to select the PLMN in an automatic manner based on at least one criterion, if the PLMN selection mode is in an automatic mode.

11. The UE of claim 8, wherein the UE is further configured to modify the PLMN selection mode, based on the PLMN selected by the UE.

12. The UE of claim 8, wherein the UE is one of a mobile device, a smartphone, a personal digital assistant (PDA), a tablet, a wearable smart device, a phone, a cellular device, a cellphone, a mobile phone, a mobile terminal, an electronic tablet, and any other device configured to communicate using a UICC.

13. The UE of claim 8, wherein the UE communicates by one of long term evolution (LTE), global system for mobile communication (GSM), universal mobile telecommunications system (UMTS), enhanced data rates for GSM evolution (EDGE), code division multiple access (CDMA), and CDMA2000.

14. The UE of claim 8, wherein a manual mode is indicated by one of a pop-up, an indication in a status bar, an audio indication, a combination of a visual and an audio indication, and a widget.

15. A user equipment (UE), comprising:
 a UE controller;
 at least one universal integrated circuit card (UICC) connected to the UE controller, wherein the at least one UICC includes an elementary file (EF) containing a public land mobile network (PLMN) selection mode;
 a user interface connected to the UE controller;
 a non-volatile memory connected to the UE controller; and
 a communication module connected to the UE controller, wherein when the EF is not present in the UICC, the UE controller is further configured to select the PLMN automatically upon detecting a change in at least one of an international mobile subscriber identity (IMSI) and the UICC.

16. The UE of claim 15, wherein the UICC is comprised of:
 a UICC controller;
 a non-volatile memory connected to the UICC controller; and
 a communication interface connected to the UICC controller.

17. The UE of claim 15, wherein the UE is one of a mobile device, a smartphone, a personal digital assistant (PDA), a tablet, a wearable smart device, a phone, a cellular device, a cellphone, a mobile phone, a mobile terminal, an electronic tablet, and any other device configured to communicate using a UICC.

18. The UE of claim 15, wherein the UE communicates by one of long term evolution (LTE), global system for mobile communication (GSM), universal mobile telecommunications system (UMTS), enhanced data rates for GSM evolution (EDGE), code division multiple access (CDMA), and CDMA2000.

* * * * *